US008499330B1

(12) United States Patent
Albisu et al.

(10) Patent No.: US 8,499,330 B1
(45) Date of Patent: Jul. 30, 2013

(54) ENTERPRISE DESKTOP SECURITY MANAGEMENT AND COMPLIANCE VERIFICATION SYSTEM AND METHOD

(75) Inventors: Luis F. Albisu, Fairfax Station, VA (US); Patricia M. DeVere, Warrenton, VA (US); Walter J. Gula, Alpharetta, GA (US); David A. Singel, Annandale, VA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1465 days.

(21) Appl. No.: 11/272,766

(22) Filed: Nov. 15, 2005

(51) Int. Cl.
*H04L 29/06* (2006.01)

(52) U.S. Cl.
USPC .................................................. 726/1; 726/27

(58) Field of Classification Search
USPC .......................................................... 726/1, 27
See application file for complete search history.

(56) References Cited

U.S. PATENT DOCUMENTS

| 6,304,973 | B1 | 10/2001 | Williams |
| 6,542,994 | B1 | 4/2003 | Dircks et al. |
| 6,584,568 | B1 | 6/2003 | Dircks et al. |
| 6,714,976 | B1 | 3/2004 | Wilson et al. |
| 6,735,701 | B1 * | 5/2004 | Jacobson ........................... 726/1 |
| 6,895,503 | B2 * | 5/2005 | Tadayon et al. ............... 713/168 |
| 6,912,502 | B1 * | 6/2005 | Buddle et al. ................. 705/7.41 |
| 7,159,237 | B2 * | 1/2007 | Schneier et al. ................... 726/3 |
| 7,167,983 | B1 * | 1/2007 | Tiller et al. .................... 713/166 |
| 7,231,668 | B2 * | 6/2007 | Jacobson ......................... 726/26 |
| 7,260,830 | B2 * | 8/2007 | Sugimoto ........................... 726/1 |
| 7,299,504 | B1 * | 11/2007 | Tiller et al. ...................... 726/30 |
| 7,484,237 | B2 * | 1/2009 | Joly et al. .......................... 726/1 |
| 7,493,650 | B2 * | 2/2009 | Peled et al. ....................... 726/1 |
| 7,574,740 | B1 * | 8/2009 | Kennis .............................. 726/22 |
| 7,747,494 | B1 * | 6/2010 | Kothari et al. ................... 705/35 |
| 7,752,125 | B1 * | 7/2010 | Kothari et al. ................... 705/38 |
| 7,917,938 | B2 * | 3/2011 | Jacobson ........................... 726/1 |
| 8,201,256 | B2 * | 6/2012 | Patanella ......................... 726/25 |
| 8,272,061 | B1 * | 9/2012 | Lotem et al. .................... 726/25 |
| 8,333,659 | B2 * | 12/2012 | Driemeyer et al. ............. 463/29 |
| 2001/0049793 | A1 * | 12/2001 | Sugimoto ...................... 713/200 |
| 2002/0059093 | A1 * | 5/2002 | Barton et al. .................... 705/10 |
| 2002/0087882 | A1 * | 7/2002 | Schneier et al. .............. 713/201 |
| 2002/0194014 | A1 * | 12/2002 | Starnes et al. ..................... 705/1 |

(Continued)

OTHER PUBLICATIONS

NIST Special Publication 800-61, Computer Security Incident Handling Guide, http://csrc.nist.gov/publications/nistpubs/800-61/sp800-61.pdf, Jan. 2004.*

*Primary Examiner* — David Garcia Cervetti
(74) *Attorney, Agent, or Firm* — Myers Bigel Sibley & Sajovec PA (57) ABSTRACT

A method for desktop enterprise security management that addresses the multiple network and desktop security needs of an enterprise, facilitates the development, implementation, and enforcement of the enterprise's desktop security policies and procedures, and provides for review and revision of those policies and procedures. The method is based on a four-stage approach to desktop network security management. The first stage lays the foundation for the enterprise's network security policy. The second stage validates users and desktop devices according to the enterprise's desktop security policies, gathers data, and provides feedback to users regarding their compliance with the enterprise's desktop security policies. The third stage enforces the enterprise's desktop security policies by blocking access by desktop devices and/or users that do not comply with the enterprise's desktop security policies. The fourth stage includes periodic review of the enterprise's needs so that new desktop security support teams can be identified and the enterprise's desktop security policies implemented with the new teams.

5 Claims, 8 Drawing Sheets

U.S. PATENT DOCUMENTS

| | | | |
|---|---|---|---|
| 2003/0065641 A1* | 4/2003 | Chaloux | 707/1 |
| 2003/0065942 A1* | 4/2003 | Lineman et al. | 713/201 |
| 2004/0010709 A1* | 1/2004 | Baudoin et al. | 713/201 |
| 2004/0162996 A1* | 8/2004 | Wallace et al. | 713/201 |
| 2004/0193907 A1* | 9/2004 | Patanella | 713/200 |
| 2005/0010820 A1* | 1/2005 | Jacobson | 713/201 |
| 2005/0027980 A1* | 2/2005 | Peled et al. | 713/164 |
| 2005/0066021 A1* | 3/2005 | Megley | 709/223 |
| 2005/0132225 A1* | 6/2005 | Gearhart | 713/201 |
| 2005/0187878 A1* | 8/2005 | Khaishgi et al. | 705/58 |
| 2005/0257244 A1* | 11/2005 | Joly et al. | 726/1 |
| 2006/0031351 A1* | 2/2006 | Marston et al. | 709/206 |
| 2006/0101518 A1* | 5/2006 | Schumaker et al. | 726/25 |
| 2006/0107329 A1* | 5/2006 | Frank et al. | 726/26 |
| 2006/0150247 A1* | 7/2006 | Gafken | 726/17 |
| 2006/0161444 A1* | 7/2006 | Lubrecht et al. | 705/1 |
| 2006/0161879 A1* | 7/2006 | Lubrecht et al. | 717/101 |
| 2006/0195905 A1* | 8/2006 | Fudge | 726/25 |
| 2006/0277083 A1* | 12/2006 | Spielmann et al. | 705/7 |
| 2007/0088635 A1* | 4/2007 | King | 705/30 |
| 2007/0124803 A1* | 5/2007 | Taraz | 726/4 |
| 2007/0266420 A1* | 11/2007 | Hawkins et al. | 726/1 |
| 2008/0235807 A1* | 9/2008 | Cross et al. | 726/27 |

* cited by examiner

ENTERPRISE DESKTOP SECURITY MANAGEMENT AND COMPLIANCE VERIFICATION SYSTEM AND METHOD

FIELD OF THE INVENTION

The invention relates generally to network security. More specifically, the invention relates to a system and method for implementing and verifying network security over a network made up of multiple desktop and laptop computer workstations as well as over multiple organizations responsible for supporting the enterprise's user desktop and laptops and implementing the desktop security policies.

BACKGROUND OF THE INVENTION

The widespread use of computer networks has changed the way that corporate enterprises access and work with information. In addition, the rise in use of portable devices such as laptop computers, at-home desktop computers, handheld "pocket PCs," and PDAs have changed the security complexion and nature of the data network. Instead of being merely a workstation physically located within a corporate enterprise's premises, a user's "desktop" may consist of a desktop computer, a laptop computer, a portable device, or some combination of any or all of these devices. At the same time, because of these portable devices, the user no longer needs to be physically present within a corporate enterprise's premises in order to access the network, but instead can access the network from many other places.

The expansion of the nature of a user's "desktop" and the increased ability to access a corporate enterprise's network outside the corporate enterprise's premises have increased the need for an enterprise to establish, implement, and monitor desktop security procedures and to ensure compliance with those procedures. Access by non-compliant devices can pose significant dangers to the security of an enterprise's network as well to the user's and corporate data. These dangers can come in many forms, such as the infiltration of computer viruses or so-called computer "worms" into the network with possibly catastrophic results; use of software that is incompatible with the enterprise's operating system or other applications, causing system crashes; or even something as simple as outmoded or obsolete equipment that decreases the efficiency of the enterprise. In addition, an enterprise must protect itself against the release of confidential or proprietary information that can result from unauthorized entry into its network.

Thus, it has become increasingly important that an enterprise develop and maintain policies and procedures to protect the security of its network. Such network desktop security policies and procedures may include device verification to identify the device being used to access the network; by verifying the device, the enterprise can ensure that the device used complies with minimum network access criteria such as up-to-date operating system and other software and meets network security parameters such as up-to-date virus and spyware protection. Desktop security policy may also include user verification to prevent access by unauthorized users or to unauthorized information or applications. Network security may further include any other security criteria established by an enterprise as necessary or desirable for the enterprise's operation.

In addition, to ensure that the users and desktops are authorized to access the network and that only authorized persons are able to work within the network, it is desirable to have a system for identification of any problems relating to network security and collection of data regarding security compliance and the resolution of issues relating to the same.

Because of the importance of such network and desktop security to the well-being of an enterprise, many systems have been developed to address these desktop security issues. For example, U.S. Pat. No. 6,714,976 to Wilson et al. discloses a system and method for monitoring a network based on the detection of triggering events and collecting data resulting from or regarding those events. U.S. Pat. No. 6,584,568 to Dircks et al. discloses a network security method where the administrator can remotely establish a user profile that loads every time that a user accesses a network and that is used to provide the user access only to authorized network applications and utilities. U.S. Pat. No. 6,542,994 also to Dircks et al. similarly discloses a system and method relating to user authentication and login security, to ensure that the network is accessed only by users who are authorized to do so. U.S. Pat. No. 6,304,973 to Williams discloses a secure network that implements a restricted access system through the use of encrypted communications between the user's device and a common network medium connecting the devices.

None of these prior art systems, however, provide an integrated approach to the question of network security, one that encompasses multiple aspects of the network security process. These aspects include establishment and maintenance of desktop security policies and procedures to implement those policies, establishment of desktop security support teams who are responsible for maintaining security compliance for an organization's desktop population in accordance with those policies and procedures, education of users regarding the importance of network security to the enterprise, compilation of data regarding network security status of one or more user or set of users, and periodic review of all these aspects to ensure that the enterprise's network security needs are being met without unduly restricting users.

Thus there is a need for an integrated approach to desktop security management that addresses the multiple desktop security management needs of an enterprise.

BRIEF SUMMARY OF THE INVENTION

The present invention relates to a method for desktop enterprise security management that addresses the multiple desktop security needs of an enterprise, facilitates the development, implementation, and enforcement of the enterprise's desktop security policies and procedures, and provides for review and revision of those policies and procedures as appropriate.

The present invention is based on a four-stage approach to desktop enterprise security management. The first stage relates to laying the foundation for the enterprise's desktop security position, including establishing an enterprise's desktop security policy and the procedures for enforcement of that policy, identifying desktop security support teams, sharing information regarding the enterprise's security policy goals and procedures with those team members, and establishing procedures to obtain necessary information regarding the users and devices that will be accessing the network and thus be subject to the enterprise's network security policies.

The second stage of the method of the present invention relates to validating users and desktop devices according to the enterprise's desktop security policies, establishing procedures to gather data regarding the network security compliance status of the enterprise, either as a whole or for smaller enterprise units, and providing feedback to users regarding the state of their compliance with the enterprise's network security policies.

The third stage of the method of the present invention relates to enforcement of the enterprise's desktop security policies. This stage includes blocking network access by desktop devices and/or users that do not comply with the enterprise's network security requirements, establishing risk management assessment of non-compliant desktop devices, and developing procedures to remedy or otherwise address such non-compliant status.

The fourth stage of the method of the present invention relates to maintenance of the enterprise's desktop security policies. This stage includes periodic review of the enterprise's security compliance needs so that new desktop security support teams can be identified and the enterprise's security policies implemented with the new teams, periodic review of the process used to identify non-compliant desktop devices and/or users and the development and implementation of new procedures as necessary, and periodic review of the enterprise's overall network security compliance policy and the steps of the previous three stages involved in implementing and enforcing the policy. In such a way, the system provides for continual review and updating as necessary to achieve the highest level of network security while meeting the changing needs of its users.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
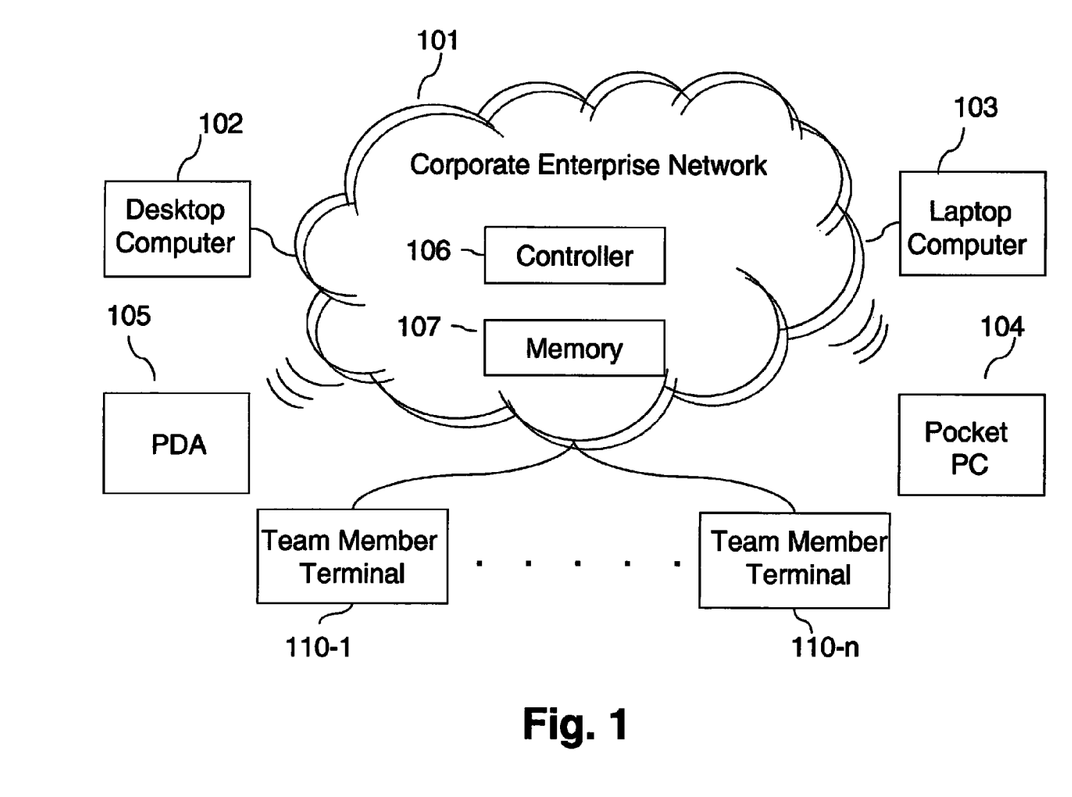
FIG. 1 is a block diagram of a network and typical devices that access the network.

The present invention relates to a system and method for establishing, implementing, and maintaining desktop security policies and procedures within an enterprise. Such an enterprise may have multiple users who access the enterprise's network in many different ways, using many different types of devices. As shown in FIG. 1, a network 101 containing a controller 106 and memory 107 and may be accessed by a variety of devices. For example, the network may be accessed by a user's desktop computer 102 physically located within the enterprise's premises. The network may also be accessed by a laptop computer 103 also physically located within the enterprise's premises and connected to the network either via a hard-wire connection or a wireless connection. Alternatively, a device for accessing the enterprise's network may be desktop or laptop computer physically located outside the enterprise's premises and which attempts to access the network remotely by means of a dial-up or other connection to the Internet or by means of some other path to the network such as a Virtual Private Network (VPN). Increasingly, such devices also include wireless devices such as handheld computers, "pocket PCs" 104, personal data assistants ("PDAs") 105, and the like. All of these devices, whether physically located within the enterprise's premises or not, may constitute the user's "desktop" from which the user accesses the network and works with files and applications located thereon.

Because many of these desktop devices are not actually physically present at the enterprise's premises at all times, it becomes essential to have security policies and procedures in place to ensure that these desktops do not pose a danger to the enterprise's network, data, or applications or limit the enterprise's exposure to a threat. The present invention includes a number of desktop security support teams with team members located at desktop security support terminals 110-1 through 110-n shown in FIG. 1. It is to be understood that these desktop security support terminals may take the form of any device that may access the network, including a desktop computer, laptop computer, or other portable device.

Figure 2:
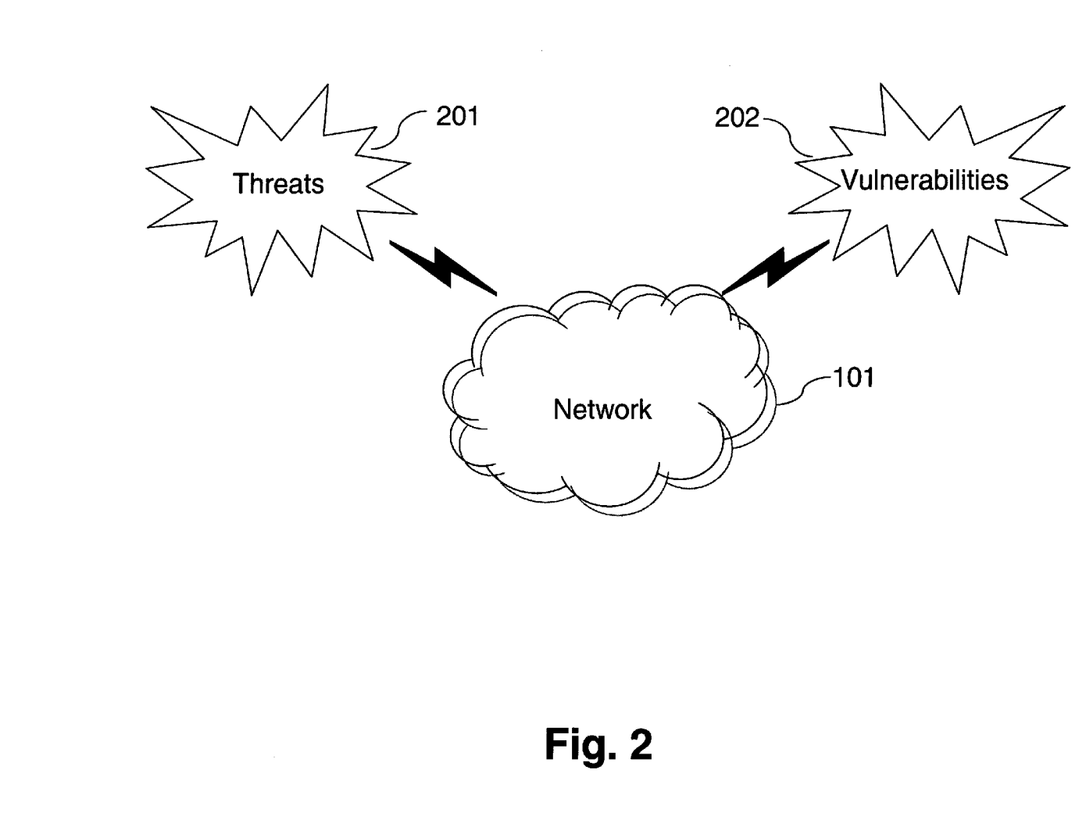
FIG. 2 is a block diagram showing the susceptibility of the network to threats and vulnerabilities from outside the network.

As shown in FIG. 2, the dangers posed by the many kinds of desktops and connections include threats 201 to the network such as cyber attacks, viruses, worms, so-called "Trojan horses", a desirable and seemingly innocuous or legitimate program which actually houses a destructive program i.e. once installed the program might erase the user's hard drive data or "phishing" (i.e., a fraudulent email sent from a potentially legitimate-looking source which requests detailed personal and/or financial information for identity theft and other fraudulent uses). These many kinds of desktops also are susceptible to vulnerabilities 202 such as out-of-date virus or spyware protection, operating system incompatibility, or lack of requisite operating system or software "patches", which affect the ability of the desktop to interact properly with the network.

Figure 3:
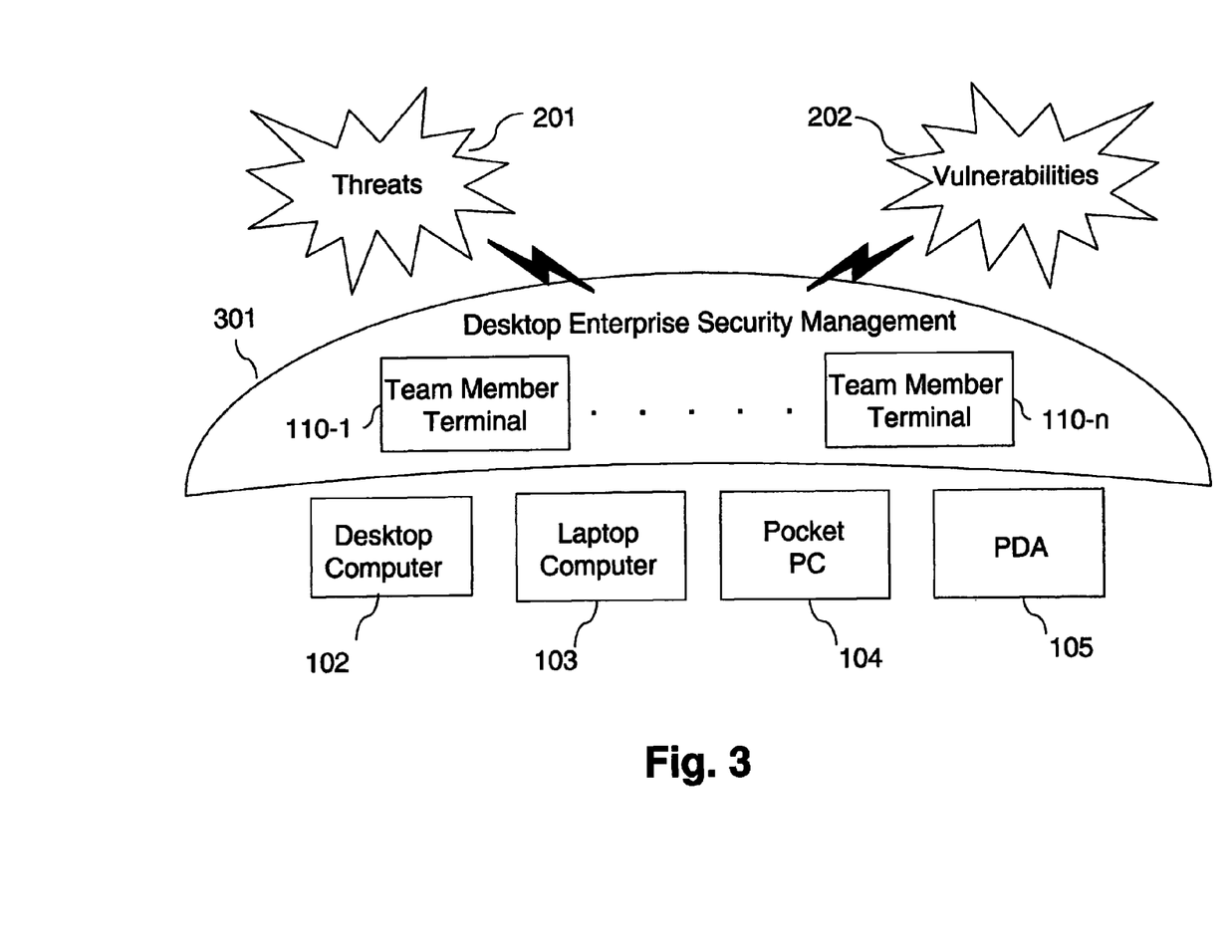
FIG. 3 is a block diagram showing the way in which desktop enterprise security management shields the network from threats and vulnerabilities from outside the network.

As shown in FIG. 3, the desktop enterprise security management system 203, which includes the network controller 106 and memory 107 (not shown in FIG. 3) and team member terminals 110-1 through 110-n, provides a shield to the network from the threats and vulnerabilities presented by the many types of desktop devices that may access the network. The desktop enterprise security management system and method (hereinafter "D-ESM") of the present invention addresses these needs in a comprehensive manner.

Figure 4:
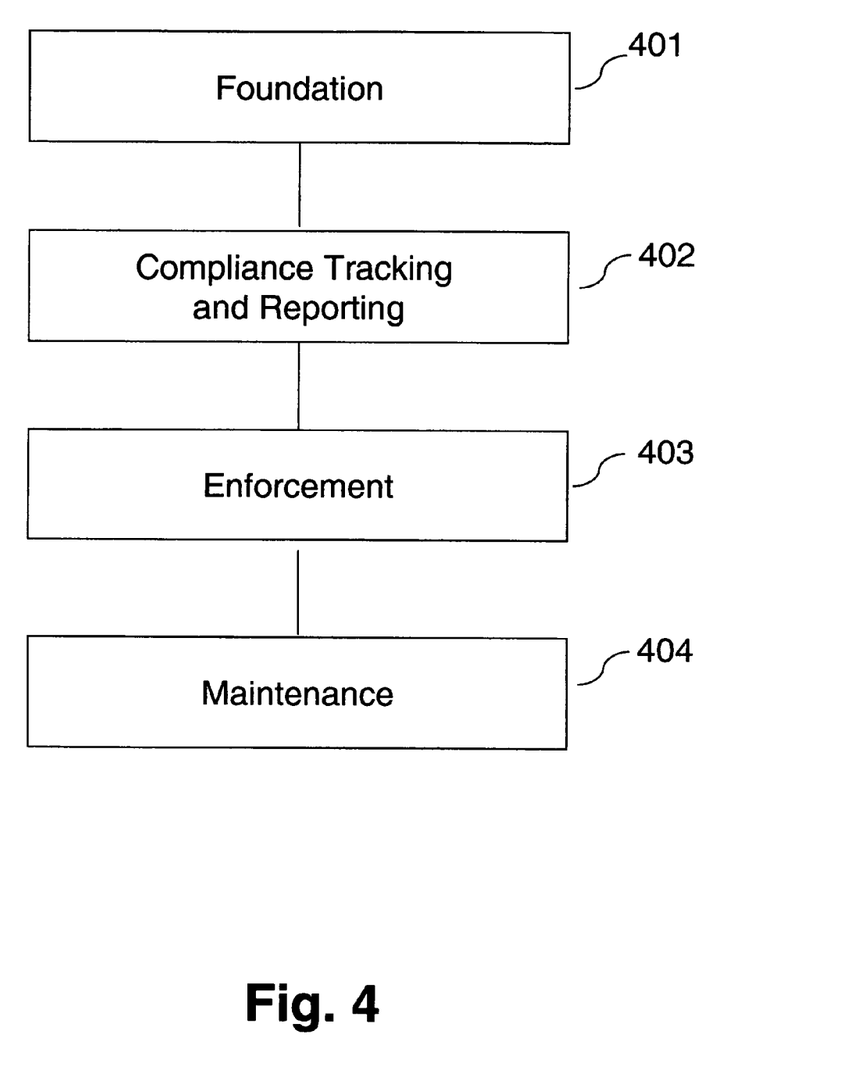
FIG. 4 is a flow chart of the four stages of the desktop enterprise security management system and method of the present invention.

As shown in FIG. 4, the D-ESM provides a four-stage approach to the creation and maintenance of an enterprise's network security. The first stage 401 lays the foundation for the enterprise's desktop security position. In the context of the present invention, an enterprise's desktop security position is a result of the application of the enterprise's desktop security policies and procedures and its compliance with those policies and procedures to protect the network security of the enterprise. Thus, this first stage 401, laying the foundation for the enterprise's desktop security position, consists of establishing the policies and procedures to be used in enforcing and maintaining the policy. The second stage 402 involves the collection of information regarding the network access attempts by the enterprise's user community. The third stage 403 involves enforcement of the enterprise's network security policies by evaluating the risks associated with non-compliant access and blocking access as necessary to protect the enterprise and its network. The fourth stage 404 involves review, maintenance, and revision of the network security policy and the previous three stages as necessary to meet the enterprise's security needs.

These four stages will now be discussed in greater detail and with reference to the Figures herein.

Figure 5:
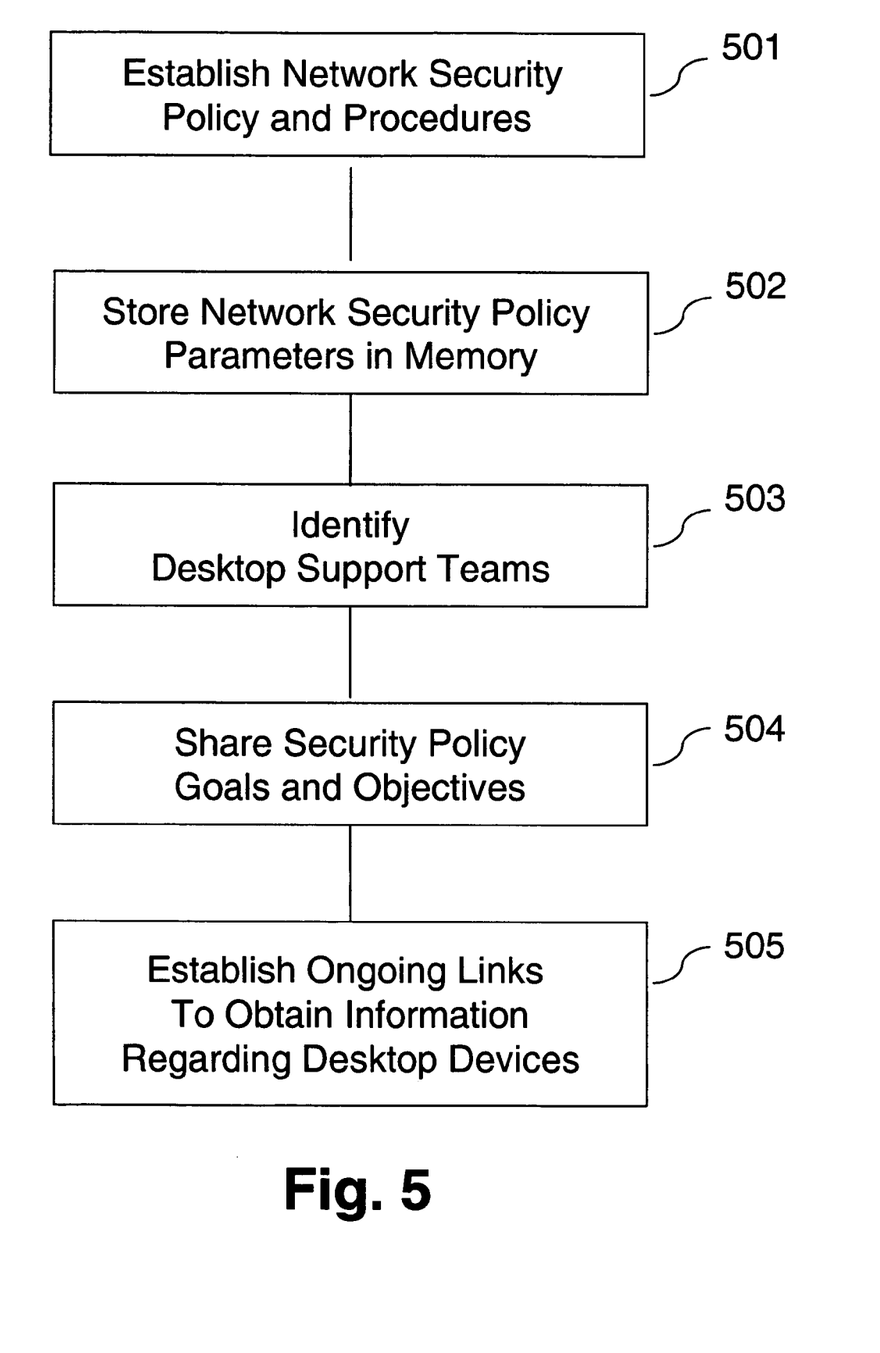
FIG. 5 is a flow chart of the first stage of the desktop enterprise security management system and method of the present invention.

As shown in FIG. 5, the first stage in the D-ESM, the "Foundation Stage," lays the foundation for the implementation of an enterprise's network security system. The first step 501 in the Foundation Stage is establishing desktop security policies and desktop security policies and procedures may be stored in network memory 107 and accessed via network controller 106. The next step 503 is identifying desktop security support teams who are responsible for maintaining security compliance for an organization's desktop population within the enterprise. The members of these teams access the network via network terminals 110-1 through 110-*n*, and are responsible for the development, maintenance, and enforcement of the enterprise's desktop security policies and procedures stored in network memory 107 and for management of the network security compliance as implemented by controller 106. These teams also become the focal point for addressing any desktop security events that may occur, such as accidental infiltration by viruses or worms, access attempts by unauthorized equipment or unauthorized users, or actual unauthorized access by outsiders such as hackers. These teams may be formal teams within an enterprise's organizational structure or may be more informal, ad hoc teams, as is appropriate to the nature of the enterprise.

The fourth step 504 in the Foundation Stage is sharing the enterprise's desktop security policies and procedures with its user community. This is a critical step. Obtaining the cooperation and assistance of users in implementing the enterprise's security management system is essential, since it is the users who ultimately will be responsible for ensuring that their desktop devices comply with the enterprise's security policies and that they follow all of the enterprise's desktop security procedures in attempting to access the network. If users are aware of the dangers to the enterprise from failure to maintain network security, they are much more likely to cooperate and assist in protecting the network. It also is essential to maintain this information sharing on a continual basis, so that users can be kept apprised of new dangers to the network such as viruses, worms, hacker attacks, and the like. In addition, the user community must be keep updated on the security parameters applicable to their desktop devices, such as updated anti-virus and anti-spyware software, operating systems, and access controls so that they can assist the desktop support teams in ensuring that their desktops are compliant.

The next step 505 in the Foundation Stage is the establishment of ongoing procedures to obtain and store information regarding inventory, ownership and support needs for the desktops which will access the enterprise's network and which therefore will be checked for compliance with the enterprise's security policy. Such procedures may include a requirement that each user register the devices used to access the network with the desktop security support team or with some other entity within the enterprise. The registration information may then be used to develop an inventory of the devices which will access the network. This inventory is then stored in network memory 107 and may include information on the type of device (desktop computer, laptop computer, PDA, etc.) since different devices will have different security parameters and will present different security needs. The inventory may also include information regarding the type of network connection that the device will make, i.e., via hard-wire, telephone line (e.g., a "dial-up" connection), broadband line (e.g., DSL or cable modem), or wireless connection, since each type of connection will entail its own set of security parameters relating to, for example, firewall protection, software security, and operating system compatibility. The inventory may also include information regarding the user of each device which will access the network, since the user's status within the enterprise may determine the nature and extent of the user's permitted access to the network. For example, one user may be permitted access only to specific files or types of files on the network, or be permitted to read but not to modify other files or types of files, while another user has different access or read/write privileges. This inventory information is then used by controller 106 to determine whether a device attempting to access the network is authorized. An unregistered device may be denied access to the network until it is registered and placed into the enterprise's inventory. This information also will assist the desktop support teams to establish and maintain the information needed to track whether a desktop device's attempted access complies with the enterprise's security policies.

Figure 6:
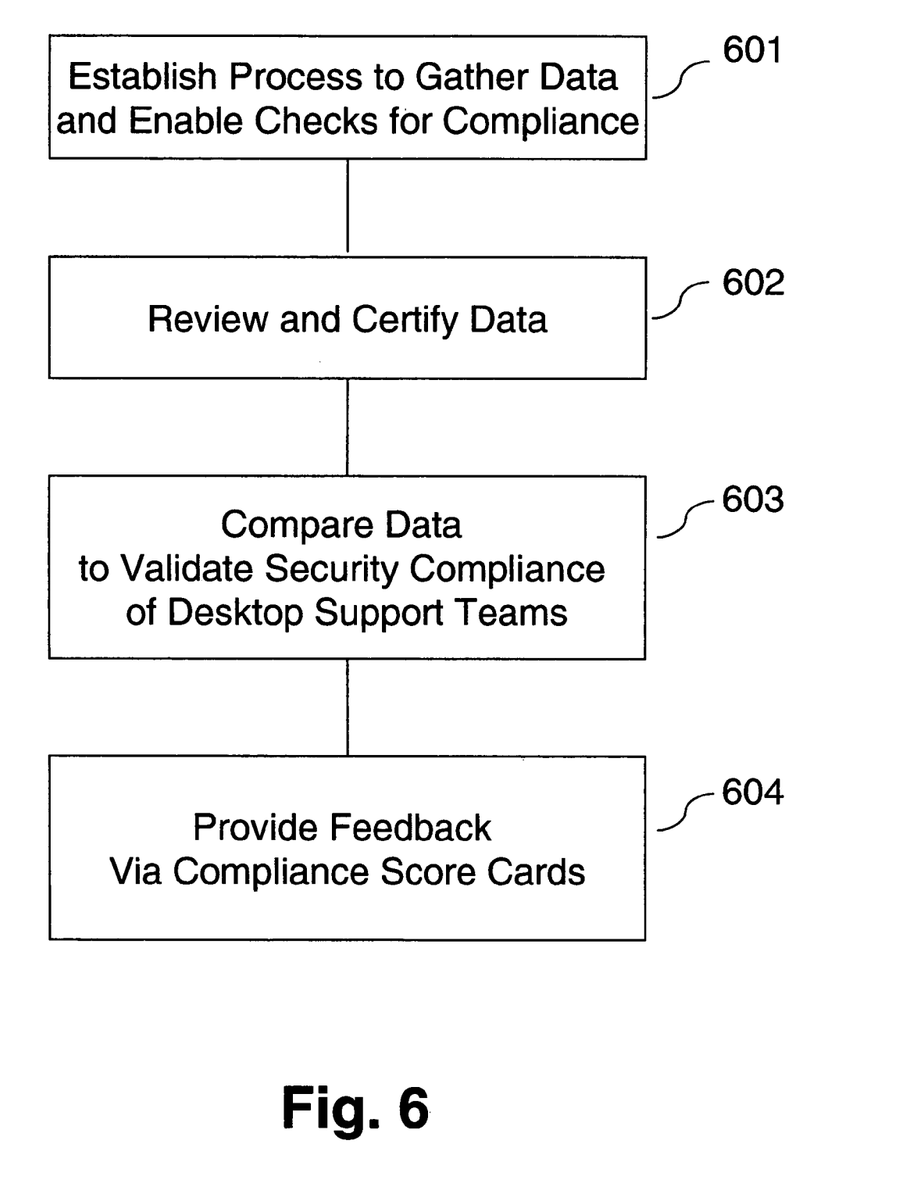
FIG. 6 is a flow chart of the second stage of the desktop enterprise security management system and method of the present invention.

The next stage of the D-ESM is the "Compliance Tracking and Reporting Stage." As shown in FIG. 6, the first step 601 of this stage involves establishment of procedures to gather information regarding the security compliance of the desktop devices and their network access. Depending on the nature of the enterprise, these procedures can be formal written procedures forming part of the enterprise's written desktop security policy and be stored within network memory 107 or can be more informal. The procedure for gathering information regarding desktop security compliance should be disseminated to each desktop support team member so that each team can be sure to follow the established procedures and gather the desired data.

The second step 602 of the Compliance Tracking and Reporting Stage involves gathering information regarding the attempts by the various desktop devices to access the enterprise's network. Whenever a desktop device attempts to access the network 101, the controller 106 checks the device by means of access authentication procedures known in the art to determine whether the device complies with the security parameters stored in memory 107 for the particular type of device and/or particular type of user. This process, known as the "Support Exception Process," will generate information regarding the network access of each desktop device and each user, including, for example, information regarding whether such device is registered, whether the device complies with the enterprise's network security policy, or whether the user's attempted access complies with the permissions granted the user. This information regarding the network access of each device is stored in memory 107 on an ongoing basis, and may be used to identify newly registered devices, obsolete devices, or devices in need of software updates other changes in configuration to bring them into compliance with the enterprise's security policies. It also may be used to track the network security compliance of particular sections or other divisions of the enterprise to identify areas in need of additional support, training, compliance, or enforcement efforts.

In the third step 603 of the Compliance Tracking and Reporting Stage, the desktop support teams compare the data gathered in the second step through the procedures established in the first step 601. This comparison step is used to validate the security compliance status of the desktops supported by each support team and the section or division of the enterprise supported by each desktop support team.

In the fourth step 604 of the Compliance Tracking and Reporting Stage, feedback regarding the information obtained in steps 601, 602, and 603 is shared with the desktop support teams, the users, and others in the enterprise such as enterprise management though, for example, the use of score cards detailing the security status of the various desktop devices accessing the network, such as the type of device, the type and current status of any anti-virus or anti-spyware software on the device, the operating system used, and the presence or absence of any necessary software patches. The score cards may be automatically generated by the network controller 106 using the information in memory 107 or may be prepared by other means as is appropriate to the enterprise. The score cards can also provide information regarding the compliance by users with security policies relating to access or read/write privileges on various files on the network. The development of score cards, wherein each element of security compliance is set out and given a ranking, easily permits the desktop support teams, users, and management to evaluate their security compliance and identify areas in need of improvement.

Figure 7:
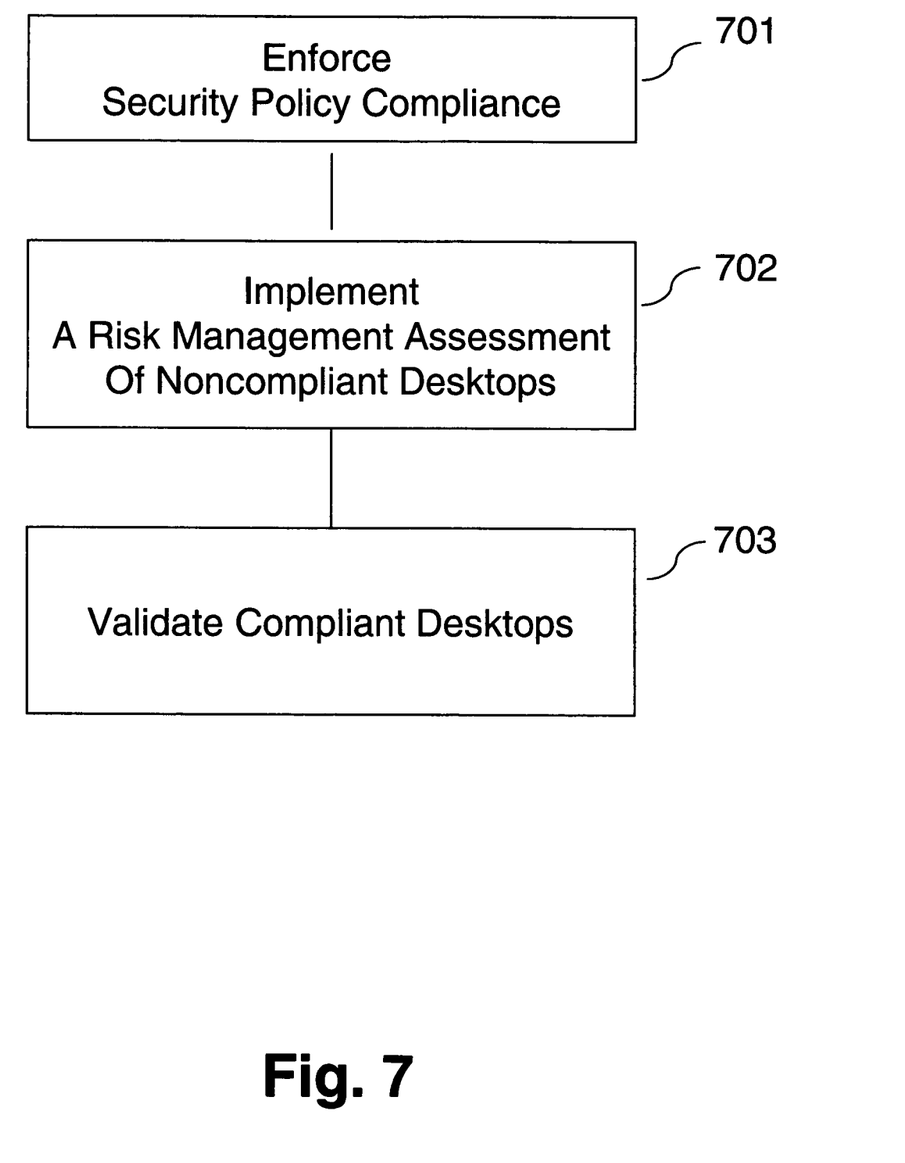
FIG. 7 is a flow chart of the third stage of the desktop enterprise security management system and method of the present invention.

The third stage of the D-ESM is the "Enforcement Stage" and relates to enforcement of the enterprise's network security. As shown in FIG. 7, the first step 701 in the Enforcement Stage is to enforce the security compliance of each desktop attempt to access the network. To enforce desktop security compliance, network controller 106 checks each attempt to access the network as it happens for compliance with the desktop security policy stored in network memory 107 and blocks those access attempts which do not comply with the policy. This process, known as a "Support Exception Process," may involve having the controller 106 remotely scan the device using established authentication methods known in the art to ensure that the device is one that is compatible with and supported on the network, that all necessary software is present and that the device does not present any risk from viruses, worms, or other malicious software. The Support Exception Process may also involve a check by the controller 106 of the attempted connection means, such as a dial-up connection, broadband, or wireless access, to ensure that the connection satisfies the enterprise's desktop security policy stored in memory 107 and to ensure that access is not attempted to be made from an unauthorized source. In addition, the controller 106 may check the network login or other access parameters of the user to authenticate the user and to ensure that the user's access and permissions on the network complies with the established access and permissions granted to that user as stored in memory 107. If a check by controller 106 of the network access attempt indicates that such access does not comply with the enterprise's desktop security policy stored in memory 107, access to the network may be granted or blocked. If access is granted, it may be with a warning that the desktop device does not comply with the network's security policies and a recommendation to bring such desktop device into compliance with the desktop security policies by some future time. If future checks of the desktop devices indicate that such device remains noncompliant, access may be blocked until such time as the desktop device is brought into compliance. Alternatively, access to noncompliant devices or connections may be blocked without any prior warning.

A decision whether to grant access with a warning or block access entirely may depend on factors such as, for example, the extent to which the desktop device does not comply with the enterprise's desktop security policy stored in memory 107 and the security risks presented by the noncompliance. Step 702 of the Enforcement Stage involves implementing a risk management assessment of such noncompliant desktop devices or such noncompliant access attempts. For example, a desktop device that does not have all recommended software updates may be considered less risky than a desktop device that does not have the most up-to-date virus protection. The risk management assessment step may be embodied in a formal procedure or may be an ad hoc assessment made at the time a user attempts to access the network, or may embody elements of both a formal and an informal procedure, depending on the nature and the extent of the risks presented by a given type of noncompliance. The enterprise may develop such policies regarding risk management as the needs arise.

As seen in step 703 of the Enforcement Stage, if a check by controller 106 made during an access attempt reveals that the desktop device is authorized and supported on the network, that it possesses all necessary desktop security features, software, and operating system requirements of the network, and that the user's access attempt is within the authorized parameters established by the enterprise, the access attempt is considered to be compliant with the enterprise's network security policy, and access to the network is granted.

Figure 8:
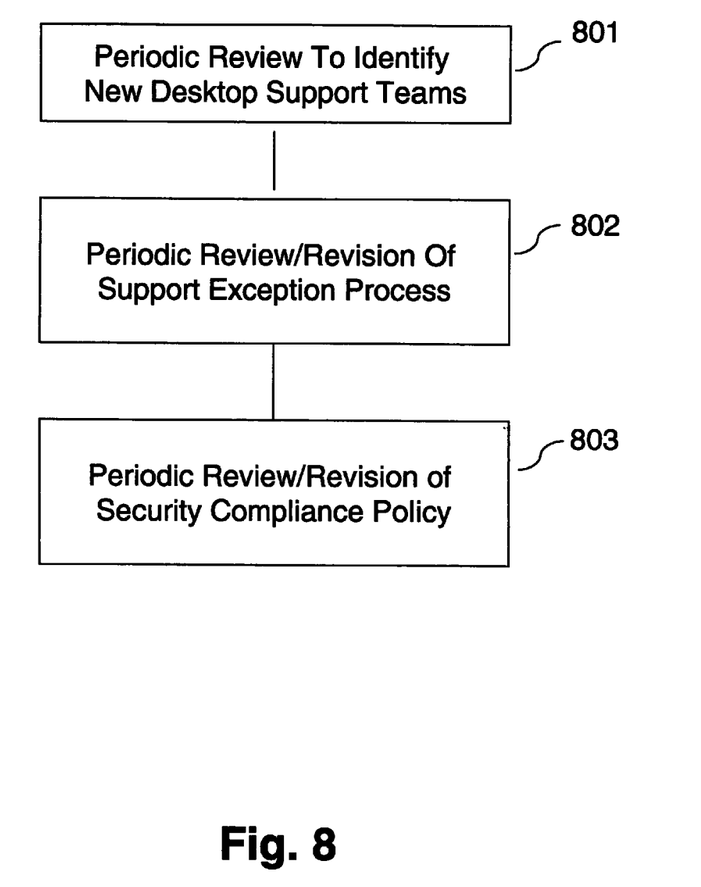
FIG. 8 is a flow chart of the fourth stage of the desktop enterprise security management system and method of the present invention.

The fourth stage of the D-ESM, the "Maintenance Stage," involves maintenance and lifecycle of the enterprise's desktop security policy management. As shown in FIG. 8, the first step 801 of the Maintenance Stage is to perform a periodic review of the desktop support teams to ensure that the team members possess all necessary information to enable them to assist in implementing and enforcing the enterprise's network security policy. Such a review also may include a review of whether the teams are sufficiently staffed to meet the needs of the enterprise and to establish new desktop support teams if necessary.

The second step 802 of the Maintenance Stage involves periodic review of the Support Exception Process used to check network access attempts, desktop devices, and user logins for compliance with the enterprise's network security policy. In this way, the desktop support teams can determine whether changes in the Support Exception process are required, such as from new risks which have arisen, old risks which have been resolved, or possible future risks associated with new devices or changes in the network. Such periodic review ensures that the process for monitoring and enforcing security compliance addresses and resolves risks to the network in a timely manner.

The final step 803 in the Maintenance Stage is performance of a periodic review of the enterprise's overall desktop security policy, the policies and procedures of the enterprise for enforcement and maintenance of the desktop security policy, and of the compliance policies associated therewith. In this way, the security of the enterprise's network is continually being updated to meet the changing needs of its users and the desktop devices they use to access the network.

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended embodiments.

We claim:

1. A system comprising:
   at least one controller; and at least one memory storing information that, when executed by the at least one controller, causes the at least one controller to perform:

establishing a desktop security policy associated with a network;

establishing a desktop security support procedure and storing the desktop security support procedure in the at least one memory;

identifying members of a desktop security support team;

outputting desktop security compliance information regarding the desktop security policy and the desktop security support procedure from the controller to a team member terminal of at least one identified member of the desktop security support team;

maintaining information regarding users and desktop devices authorized to access the network, the information including device information regarding the desktop devices and storing the information regarding users and desktop devices in the at least one memory;

obtaining device information regarding a desktop device attempting to access the network at the controller;

compiling data regarding enforcement of the desktop security policy based on the device information and the desktop security policy at the controller;

validating a security compliance status of the desktop device attempting to access the network at the controller by comparing at the controller a result from a first attempt to access the network with a result from a second attempt to access the network;

automatically generating, at the controller, a security score card for a respective desktop device authorized to access the network from the information regarding desktop devices that was maintained in the at least one memory and from the security compliant status of the desktop device attempting to access the network that was validated, and a plurality of score cards associated with a plurality of elements of security compliance, respectively, each of the plurality of score cards providing a ranking indicating a level of security compliance for a respective one of the plurality of elements of security compliance, wherein one of the plurality of elements of security compliance is access to a secure file, the score card associated with access to the secure file indicating which users attempted to access the secure file;

outputting feedback regarding the security compliance status of the desktop device attempting to access the network from the controller to a team member terminal of the desktop security support team by outputting the score card for the desktop device from the controller to the team member terminal of the desktop security support team;

evaluating the desktop device's attempt to access the network at the controller;

enforcing the network security policy from the controller using the desktop security compliance information and the device information of the desktop device attempting to access the network;

comparing at the controller the device information of the desktop device attempting to access the network to a requirement of the desktop security policy;

evaluating at the controller a risk presented by the desktop device based on the device information of the desktop device attempting to access the network and the desktop security policy requirement;

determining at the controller whether to allow the desktop device to access the network based on the device information of the desktop device attempting to access the network, the desktop security policy requirement, and a result of the comparing;

developing procedures to address non-compliant desktop devices;

performing periodic review of the desktop security policy to identify new desktop security support teams and to ensure the desktop security policy is implemented with the new desktop security support teams; and performing periodic review of the procedures to address non-compliant desktop devices.

2. The system of claim 1, further comprising receiving input from a second member of said desktop security support team regarding said attempt to access the network.

3. The system of claim 1, wherein said device information comprises an identity of a software program present on said device.

4. The system of claim 1, further comprising:

performing periodic review of said desktop security policy;

implementing a revision in said desktop security policy; and performing periodic review of said revised desktop security policy.

5. The system of claim 1, further comprising:

performing periodic review of said desktop security support procedure;

implementing a revision in said desktop security support procedure; and performing periodic review of said revised desktop security support procedure.

* * * * *